(12) United States Patent
Benarrouch

(10) Patent No.: US 8,465,033 B2
(45) Date of Patent: Jun. 18, 2013

(54) THREE-PIECE FOLDING SCOOTER

(76) Inventor: Jacques Benarrouch, Villeurbanne (FR)

( * ) Notice: Subject to any disclaimer, the term of this patent is extended or adjusted under 35 U.S.C. 154(b) by 0 days.

(21) Appl. No.: 13/503,915

(22) PCT Filed: Nov. 18, 2011

(86) PCT No.: PCT/FR2011/000610
§ 371 (c)(1),
(2), (4) Date: Apr. 25, 2012

(87) PCT Pub. No.: WO2012/072893
PCT Pub. Date: Jun. 7, 2012

(65) Prior Publication Data
US 2012/0256386 A1    Oct. 11, 2012

(30) Foreign Application Priority Data
Dec. 2, 2010 (FR) ..................................... 10 04694

(51) Int. Cl.
*B62M 1/00* (2010.01)

(52) U.S. Cl.
USPC ............... 280/87.05; 280/87.021; 280/87.041

(58) Field of Classification Search
USPC ........ 280/87.05, 11.14, 11.15, 11.16, 87.042, 280/11.28, 11.27, 39, 652, 87.041; 428/12
See application file for complete search history.

(56) References Cited

U.S. PATENT DOCUMENTS

| 7,581,739 B2 * | 9/2009 | Fraley ...................... 280/87.041 |
| 2008/0084034 A1 * | 4/2008 | Feldman et al. ......... 280/11.115 |
| 2012/0104714 A1 * | 5/2012 | Sapir ......................... 280/87.05 |

* cited by examiner

Primary Examiner — John Walters
Assistant Examiner — James Triggs
(74) Attorney, Agent, or Firm — Defillo & Associates, Inc.; Evelyn A. Defillo

(57) ABSTRACT

The present invention relates to a three-piece folding scooter whereof the front and rear wheels are fixed on two side bases (b) and (c). Each wheel is hinged to a central base formed from two oblong openings in which the wheels retract respectively when the side bases are folded down flat against the central base.

10 Claims, 14 Drawing Sheets

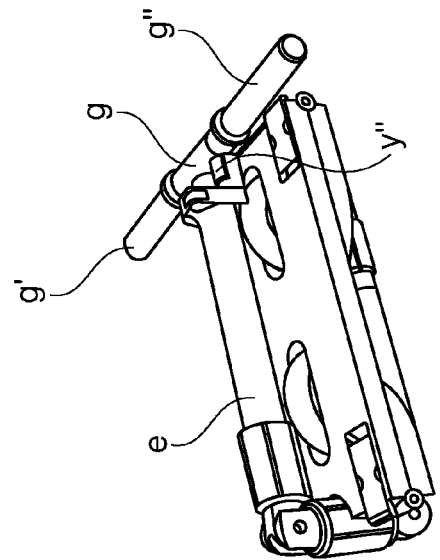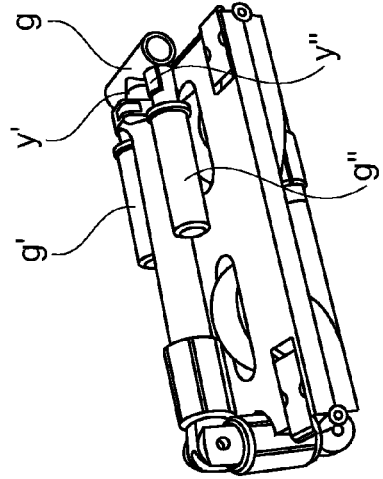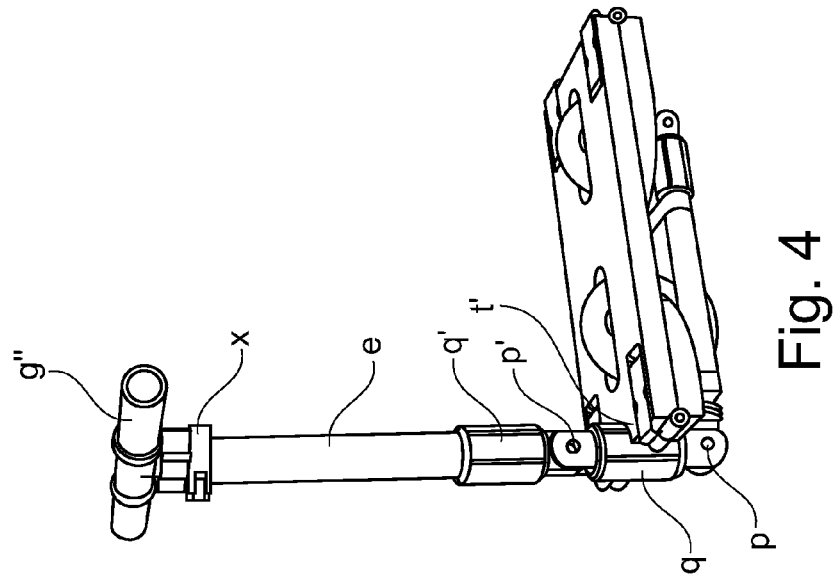

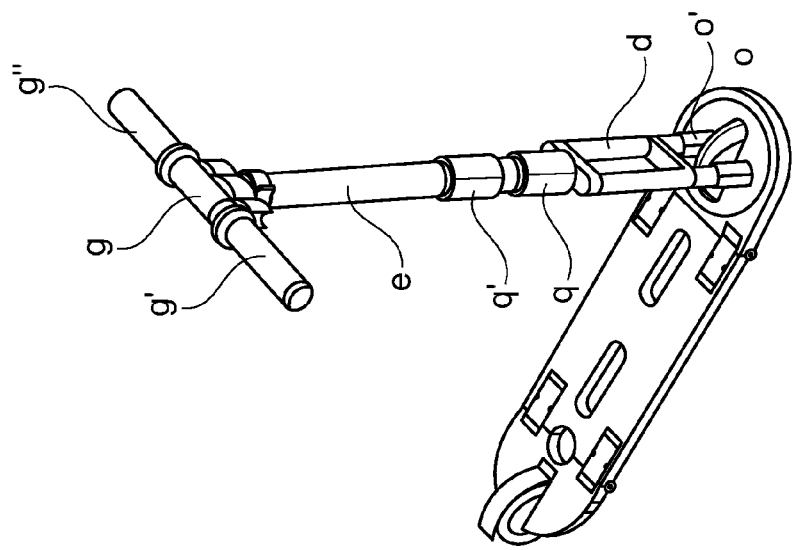
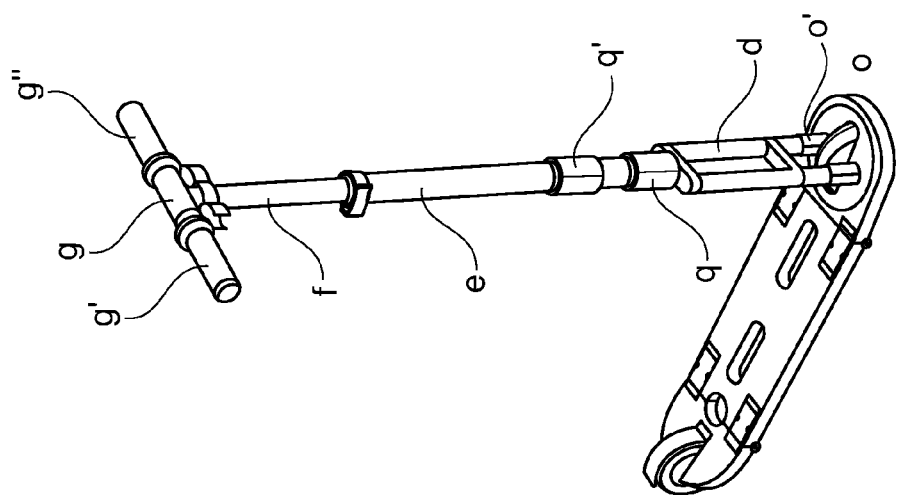

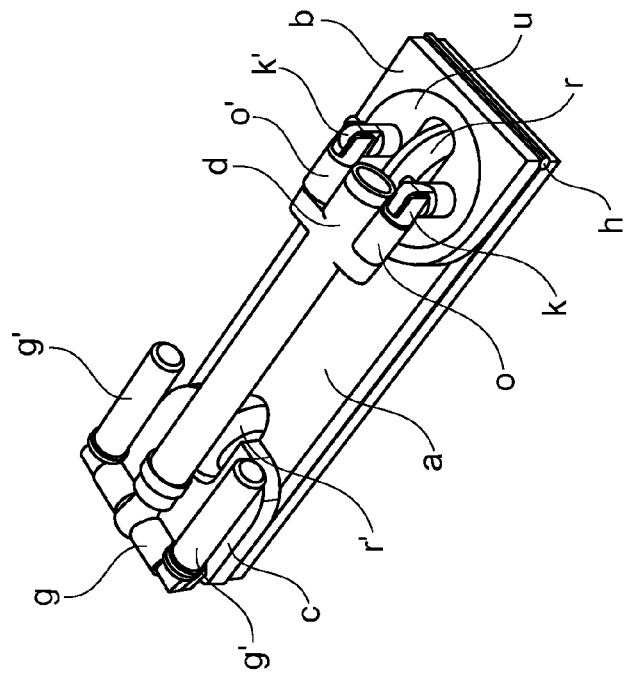
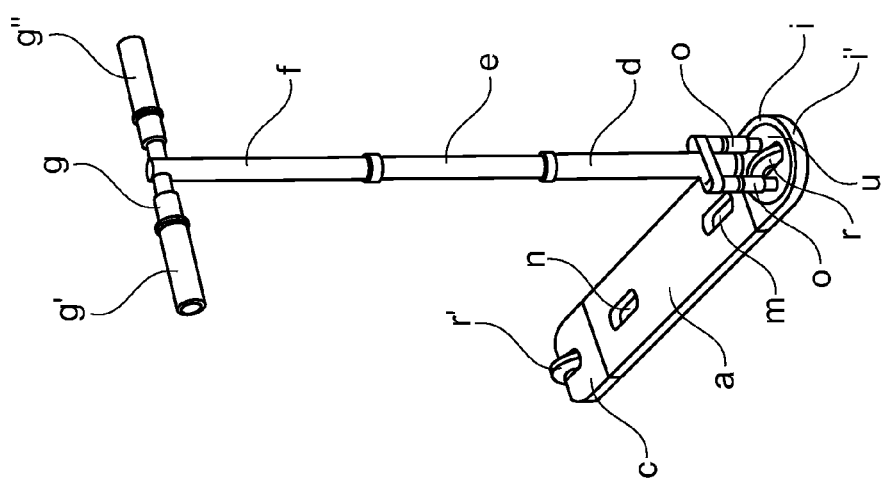

THREE-PIECE FOLDING SCOOTER

CROSS REFERENCE TO RELATED APPLICATION

This application is a national stage entry of PCT/FR2011/000610 filed Nov. 18, 2011, under the International Convention claiming priority over French Application No. 10 04694 filed Dec. 2, 2010.

FIELD OF THE INVENTION

The present invention relates to a folding scooter with a three-piece base and retractable wheels so as to reduce the folded volume to the smallest possible bulk.

BACKGROUND OF THE INVENTION

Certain scooters can be folded manually, semi-automatically or automatically, with the primary aim of saving space, fairly often to the detriment of their robustness.

SUMMARY OF THE INVENTION

The scooter according to the invention includes:
retractable wheels,
after folding, the obtained volume is the smallest possible for the scooter to be able, once deployed, to keep a sufficient length that is suitable both for adults and children.

The scooter according to the present invention, once folded, fits into a regular rhomb, the base of which is close to a fifteen centimeter square on the sides and the height of which is about 35 cm; completely deployed, its total length is approximately 65 to 70 cm, and its handlebars are situated about 1 m from the ground (FIG. 14 and FIG. 15/pl. 8); however, the steering column being telescoping, the handlebars can descend to about 65 cm from the ground. The volume of the scooter, when folded, can also be greatly reduced for use reserved solely for children. In fact, the most-used diameter of a scooter wheel for adults and children is 10 cm; however, for children aged 7-8 years to 12-13 years, the wheels used commonly have a diameter of 7.5 cm; with this wheel diameter, the scooter according to the patent, once folded, would have a length shorter than 30 cm.

After deployment and locking, it is crucial for the robustness of the inventive scooter to allow it to be used in all fields, and in particular to perform acrobatic Figures, as well as free and trampoline jumps. Taking an inventory of a large quantity of scooters, whether patented or not, reveals that there is a rather small number of devices making it possible to limit the bulk of a handlebar, a base, a rear wheel. These devices generally concern the steering column (telescoping), the base (folding into two parts on a middle or longitudinal hinge, sliding, etc.), the rear wheel (retractable).

Folding in a closed V between the base and the steering column remains the best-known way to limit the bulk in terms of height, but does not decrease the length. It will be recalled from the prior art that seeking a broad use of the scooter (simultaneously a means of transportation in calm urban settings, but also a recreational, athletic or even acrobatic vehicle) has led designers to secure the front wheel support to the base as solidly as possible, but this has three drawbacks:
1) This key concern immediately eliminates the possibilities of a significant reduction in volume.
2) Securing the front wheel support with the base still requires assembly by welding, which necessarily presents manufacturing difficulties, since performing welding that is both solid and esthetic is not easy and requires, on the line, slow work by specialists.
3) None of the front-wheel devices known to date incorporate front crash protection, with the result that very often a front wheel and/or its axle and/or its yoke explode against a hard obstacle, such as a sidewalk, curb, stair, etc.

BRIEF DESCRIPTION OF THE DRAWINGS

The invention will be well understood, and other features and advantages thereof will appear, in reference to appended diagrammatic drawing, showing, as non-limiting examples, several possible embodiments of the implantable part-screw assembly to which it pertains.

FIG. 4 is a side view of a three-piece scooter device of FIG. 3A showing the handle in an upright position;

FIG. 5 is a perspective front view of a three-piece scooter device of FIG. 4 showing the handle in a folded and retracted position;

FIG. 6 is a perspective bottom view of a three-piece scooter device of FIG. 5;

FIG. 14 is a perspective side view of a three-piece scooter device of FIG. 1 showing the handle is a full open position;

FIG. 15 is a perspective side view of a three-piece scooter device of FIG. 1 showing the handle is a retracted position;

FIG. 18 is a perspective side view of a three-piece scooter device according to another exemplary embodiment of the present invention;

FIG. 19 is a perspective bottom view of a three-piece scooter device of FIG. 18;

DETAILED DESCRIPTION OF THE INVENTION

Figure 1A:
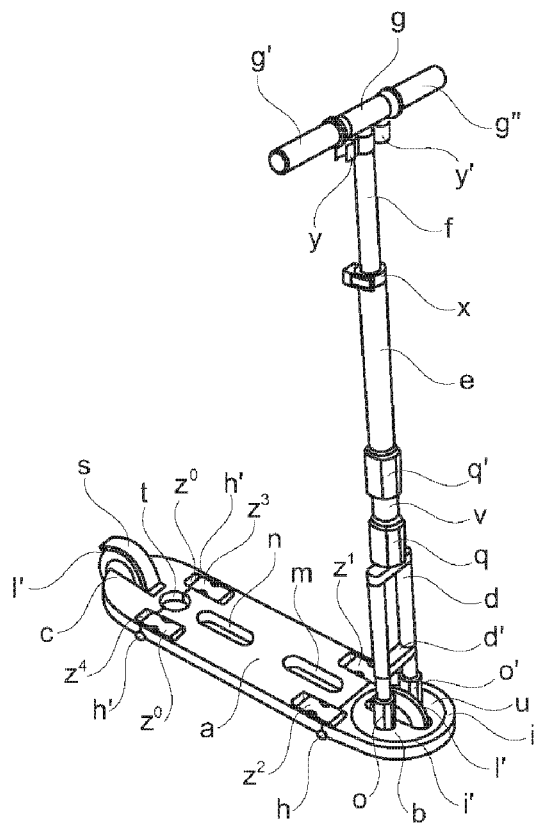
FIG. 1A is a perspective front view of a three-piece scooter device according to an exemplary embodiment of the present invention.

The three-piece scooter device according to the invention is generally shown in FIG. 1:

The base (a), central part of the scooter, includes, lengthwise, two aligned oblong median openings with the same dimensions (m) and (n), intended respectively to receive, after folding flat (FIG. 2/) of the front part (b) and the rear part (c), respectively on hinges (h) and (h') on the base (a) (hence the term three-piece), the front steering wheel (r) vertically integrated into a horizontal plate (u), held rotatably captive by (b), and the rear wheel (r') arranged with a radial footbrake (s), secured to (c) by a known return spring means.

Thus designed, (r) and (r') are partially retracted into the thickness of their respective bases (b) and (c), and then additionally retracted into the thickness of the base (a) against which (b) and (c) are folded flat. For example, if the thickness of the bases is 2 cm, and the wheel diameter is 10 cm, after retraction the wheels still protrude by 6 cm cumulatively above and below the bases.

More specifically, the two rectilinear hinges (h) and (h') are installed at the lower level of the junction edges of (b) and (c) with (a), so that in their configuration, even if no additional locking was provided between the plate (a) and the side parts (b) and (c), the scooter would remain compact during its use due to the user's weight.

It should be noted that the rear hinge (h') (FIG. 1) is interrupted, in its central portion, by the value of the diameter of a median cylindrical hole (t) diametrically overlapping between (a) and (c), the function of which will be described later.

In other words, the hinge (h') works in two in-line and symmetrical parts relative to the center of the hole (t) pierced so that the hinge line between (a) and (c) is diametric with (t).

It should be noted that this median hole could also be provided to be oblong, and positioned longitudinally in two equal volumes on (a) and (c), symmetrically relative to a median width coinciding with the junction line of (a) and (c), with the aim of optimizing its function, as will be described later.

The coplanar locking (FIG. 1) of (a) with (b) on the one hand, and of (a) with (c) on the other hand, is ensured respectively by two toggles (z1) and (z2) between (a) and (b) as well as by two toggles (z3) and (z4) between (a) and (c).

(z1) and (z2) are identical and symmetrical relative to a median line that cuts (a) longitudinally, and likewise for (z3) and (z4), on the other hand on the base (a). All four of the tilting mechanisms of these toggles are installed on the central base (a), and the locking, strictly speaking, takes place inside facing notches (z0) (FIG. 1) on the side bases (b) and (c).

Preferably for general simplification reasons, the four toggles of the patent are identical.

Figure 9:
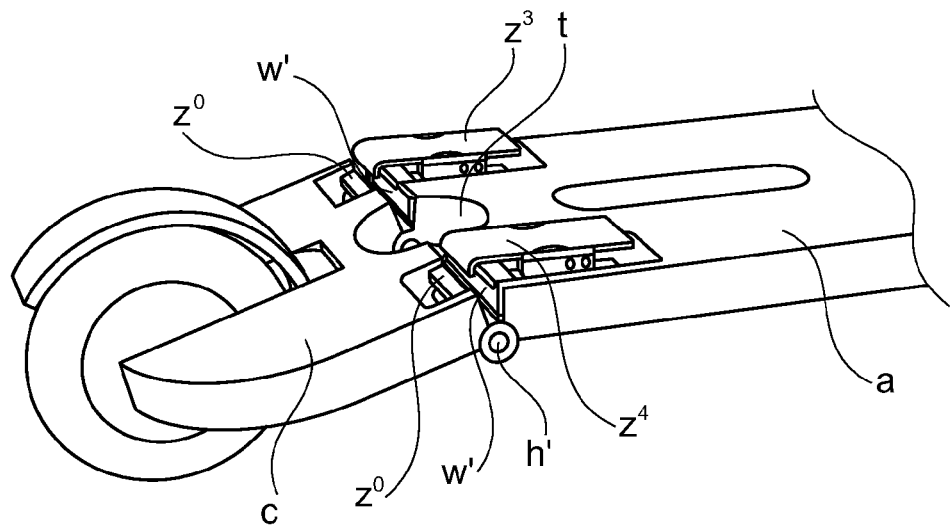
FIG. 9 shows a detail view of the toggles according to an exemplary embodiment of the present invention.

FIG. 9 shows in more detail how, specifically, the toggles (z3) and (z4) tilt to coplanarly lock (a) and (c).

In that same Figure, a Silentbloc (w') made from rubber, Neoprene, or another specific material, formed on the edge of (a) or (c), or between (a) and (c) along the hinge (h'), interrupted like that hinge by the hole (t), secured to (a) or (c) by adhesion or clipping on the selected edge, is intended on the one hand to maintain the locking of (z3) and (z4) in tension, and thereby make the coplanar assembly more flexible through a very short-amplitude damping effect, and on the other hand to minimize any friction noise between (a) and (c) during the use of the scooter.

Figure 10:
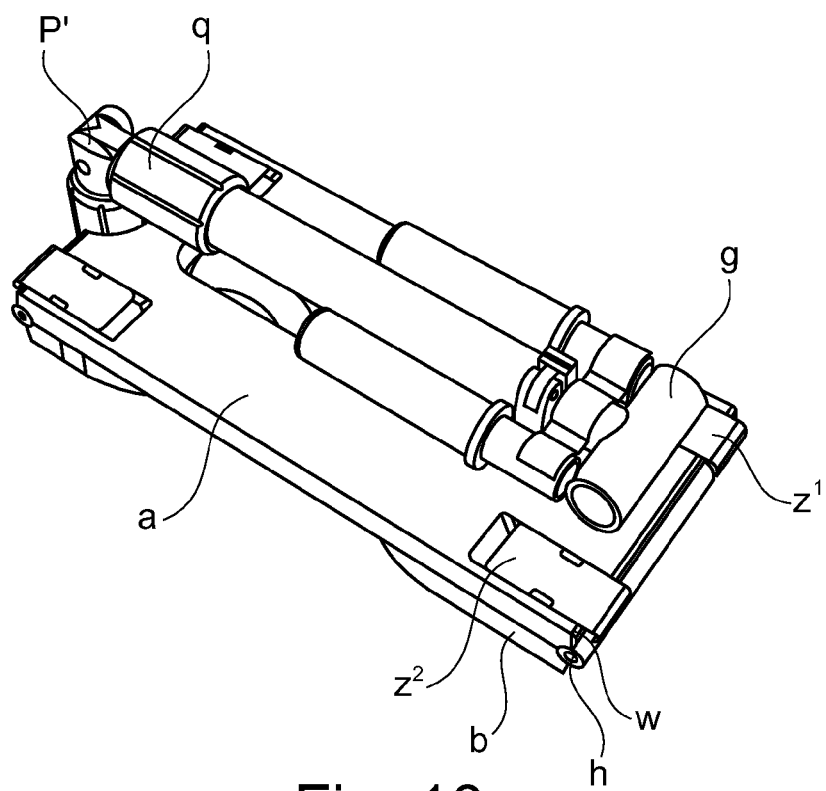
FIG. 10 shows a detail view of a silentbloc according to an exemplary embodiment of the present invention showing the silentbloc in a locking position.

Between (a) and (b) (FIG. 10) there is a same Silentbloc (w), in a single piece for the same purpose after locking of (z1) and (z2).

Figure 1B:
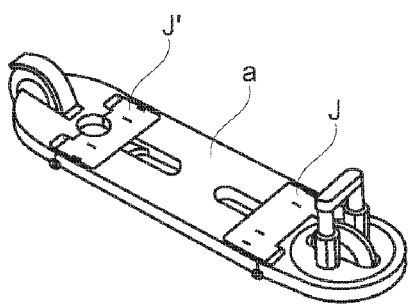
FIG. 1B is a perspective bottom view of a three-piece scooter device of FIG. 1.

FIG. 1bis shows two identical junction devices bringing together (z1) and (z2) on the one hand and (z3) and (z4) on the other hand; these devices j) and j'), fitted into the base (a) and flush with its upper surface, simply consist of two respective connections of the levers of (z1) and (z2), and of (Z3) and (z4).

They make it possible, with a single movement, to lock or unlock (z1) and (z2), and (z3) and (z4) together, the unlocking being made easier by the possibility of lifting said connecting levers, one after the other, using a finger slid under the central part of each of them, accessing it at the end of the oblong openings of the wheels where they end; j) and (j') are sized so as not to bother the positioning of the wheels in those openings during the first phase of folding the scooter, described above.

The front and rear locking can easily be done by pushing in/clipping, with the front of the foot or the heel, the levers (j) and (j'), once the scooter is open and placed on the ground for use. It should be noted that preferably, (b) and (c) are theoretically provided with the same thicknesses as (a).

Figure 2:
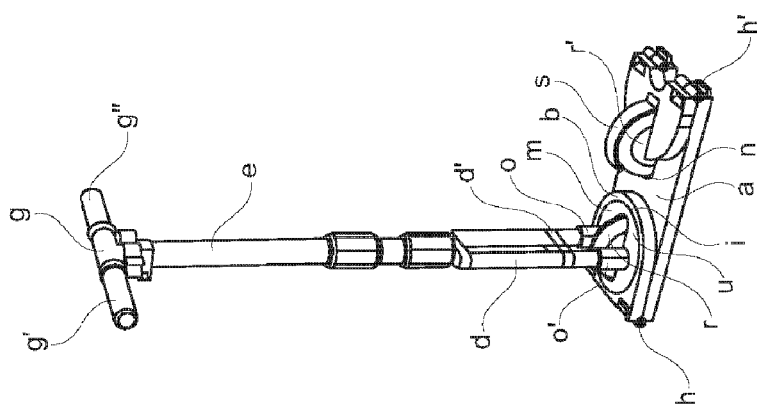
FIG. 2 is a perspective side view of a three-piece scooter device of FIG. 1 showing the scooter device having the front and rear flats folded.

Once (b) and (c) are folded flat on (a), as shown in FIG. 2, the front and rear wheels (r) and (r') respectively being housed in the openings (m) and (n), the first step for folding the scooter is carried out.

The second folding step (FIG. 3) comprises unscrewing the two inwardly threaded sleeves (o) and (o') that fix the steering unit saddle (d) (reinforced by a horizontal connection (d') between its two vertical arms), on the rotary plate (u), symmetrically on either side of the wheel (r). The single-piece saddle (d) constitutes the bottom part of the steering column of the scooter; it is fixed and extends vertically (FIG. 1) as far as the handlebars (g) by a cylindrical telescoping part made up of a fixed element (e) and a sliding element (f) in (e).

The saddle (d), using a means defined below, drives the rotary plate (u) (FIG. 1), which, preferably installed, for balance reasons, concentrically to the perimeter of the semicircular arc portion (i) of the base (b), at the hypercenter of that portion, constitutes a mechanical stack operating horizontally, made up of concentric circular elements, captive/rotary of the base (b) formed in its entire thickness with a circular opening serving as bearing cage, and the essential element of which is a cylindrical assembly made up of two opposite ball bearing systems (or a means other than balls) operating at 360°, and arranged symmetrically on the two faces (E) and (F) (FIG. 8) of a same skirt formed halfway through the thickness of the circular opening of (b); the rotary plate (u) having, among other major functions, the function of vertically integrating, captive at the center of its volume, the front wheel (r) with its horizontal axis of rotation (G), fixed or mobile.

Figure 8:
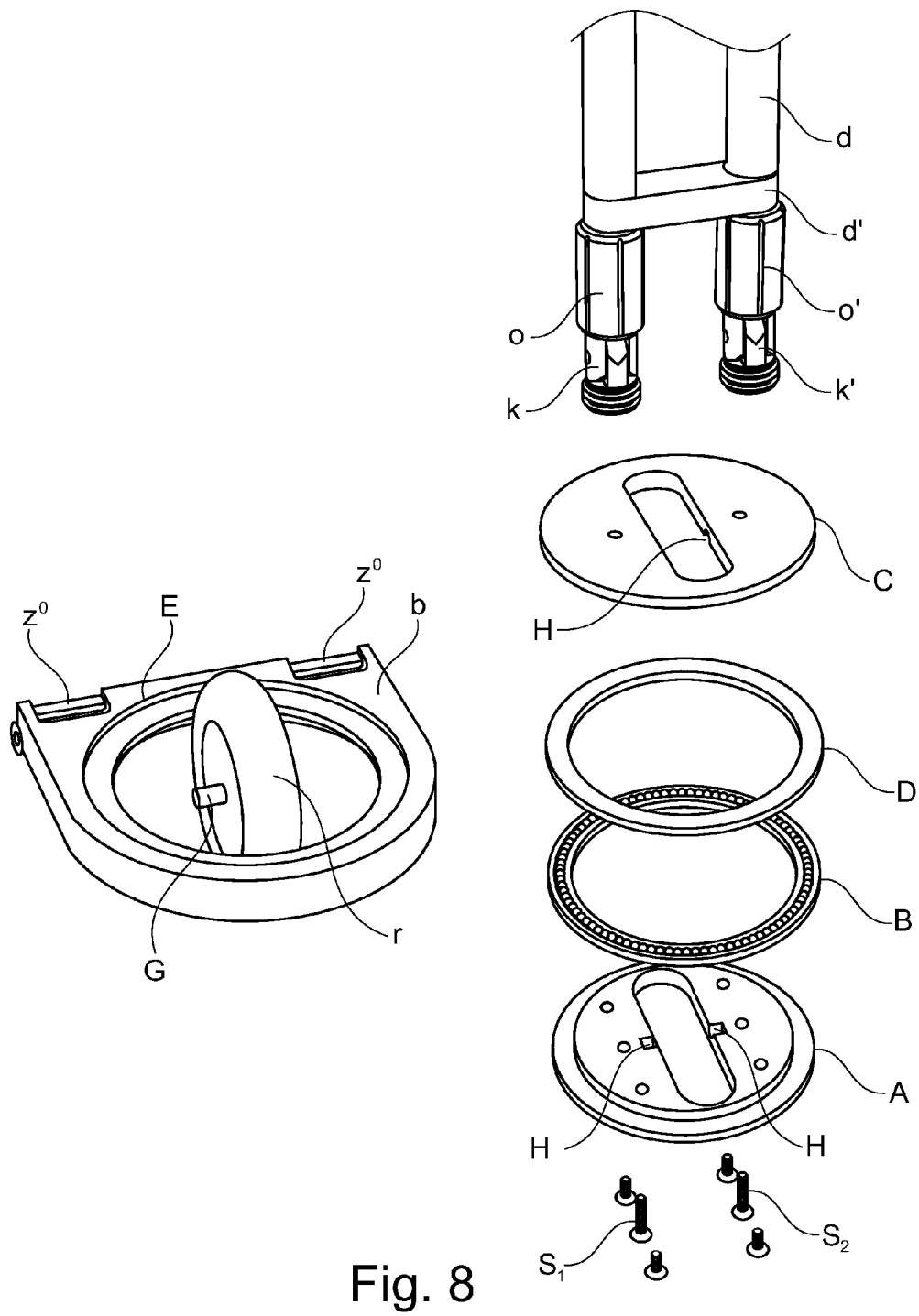
FIG. 8 shows a detail view of a rotary plate according to an exemplary embodiment of the present invention.

The same FIG. 8 details the rotary plate (u) in its various elements stacked for the desired result of mobility of the front wheel (r) at 360°; other different stacks of circular pieces differently arranged of bearings or other rotation means limiting friction would allow equivalent results.

In FIG. 8, (E) and (F) are the two faces of a thick circular skirt, integrated horizontally in a shoulder to the mass of the front base (b), and halfway through the thickness thereof. (E) and (F) support the rotary plate (u), captive of (b), in turn made up of two identical adjusted assemblies, circular and rotary by the bearing means, housed symmetrically, one against the lower part (F) of the skirt, the other against the upper part (E) of the skirt.

The first assembly comprises a circular element (A) arranged longitudinally with an oblong central opening for the passage of the front wheel (r), this opening in turn being provided laterally with two hollow wheel axle supports (H), semi-cylindrical, median, face to face.

1. supports adjusted, shouldered in a perimetric crown, a bearing (B) with a horizontal function and balls active unilaterally or bilaterally. ((B) and (D) in FIG. 8 are shown in unilateral horizontal active ball bearings.)
2. The adjusted assembly (A)+(B) is positioned as a rotary captive on the surface (F) of the shouldered skirt at mid-thickness of (b).

Likewise the plate (C) and its bearing (D) adjusted thereon, shouldered in a perimetric crown forming a second assembly identical to the first, which is positioned as a rotary captive on the surface (E) (opposite the surface (F)) of the same skirt, symmetrically to the first assembly. The calculation of the diameters and thicknesses of the various stacked elements making up (u) must be studied so that:

a. the bearings (B) and (D) turn freely, preferably in two symmetrical circular grooves to be formed on the two opposite surfaces (E) and (F) of the skirt integrated at mid-thickness of (b) (grooves not shown in the drawings), in order to avoid any radial friction against the two vertical cylindrical walls respectively ending at each of the outer diameters of the two opposite faces (E) and (F) of the skirt,
   b. the upper surface of (A) adjusts in contact against the lower face of (C) with the same surface, the oblong openings for passage of the front wheel (r) on (A) and (C) then coinciding perfectly, and embodying with them, also coinciding, face to face, two opposite cylindrical housings, the function of which is to insert the two ends (G) of the front wheel axle (r), these two housings being made up by the four identical hollow half-cylinders (H), arranged diametrically, two by two, face to face and symmetrical relative to the median contact plane between (A) and (C) on either side of the opening of the wheel (r) passage, as already mentioned.

To maintain all of the elements described above, sandwiched, rotatably captive in bearing support against (E) and (F), i.e. on either side of the shouldered skirt at mid-thickness of (b), and in the proposed superposition incorporating the wheel and its axis, one uses two high-strength long screws (S1) and (S2), preferably of the type with hollow hexagonal burred heads or hollow hexagonal cylindrical heads, passing through the contiguous thicknesses of (A) and (C) to thread vertically to the bottom, respectively at the end of each of the two arms of the saddle (d), symmetrically on either side of the wheel kept vertical on its horizontal axis.

Once the screwing/blocking of (S1) and (S2) is done, horizontally securing, in two parallel fixing points, the rotary plate (u) supporting the wheel (r), to the arms of the saddle (d), base of the steering column, the heads of the screws should preferably be embedded/flush on the outer face of (A).

The two sleeves (o) and (o') (FIG. 3) unscrewed upwardly from the lower portion of the saddle (d), under the horizontal reinforcing connection (d'), respectively free, below the saddle, two single cylindrical Cardan joints (k) and (k'), each made up of two symmetrical cylindrical articulations, each outwardly threaded to work with the inner thread of the corresponding sleeves (o) and (o').

(k) and (k') are respectively screwed/blocked by the two bases of their two lower articulations, on the rotary plate (u) (through said plate) by the screws (S1) and (S2).

Figure 3A:
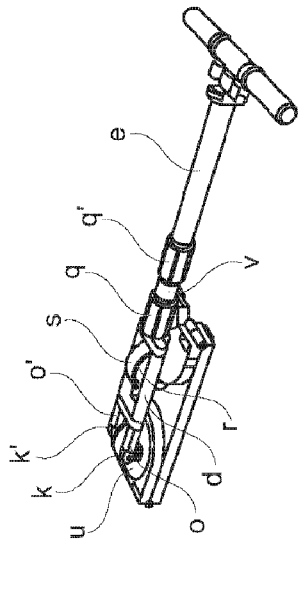
FIG. 3A is a perspective front view of a three-piece scooter device of FIG. 1 showing the handle, the front, and rear flats folded.
Figure 3B:
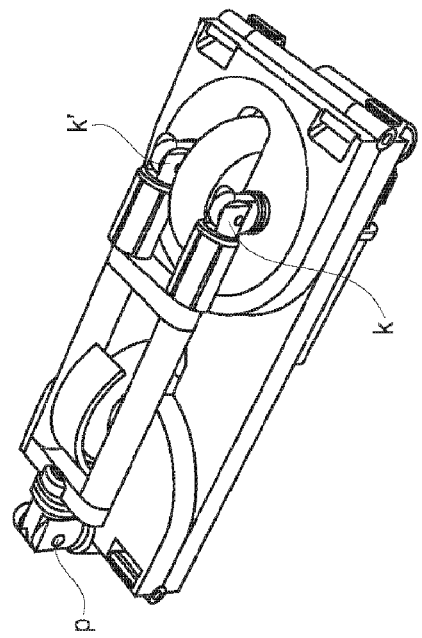
FIG. 3B is a perspective rear view of a three-piece scooter device of FIG. 3A showing the handle in a retracted position.

(o) and (o') respectively remain fixed above (k) and (k') by screwing on the outer thread of their upper articulation, at a distance from the plate (u) that makes it possible not to hinder the tilting of the saddle toward the outside of the base (b) of the scooter, in fact in the extension of a median line passing longitudinally and consecutively through (c), (a) and (b); that tilting is made possible by the means for releasing the articulations of the single cylindrical Cardan joints (k) and (k'); at the end of folding (FIG. 3*bis*) of the saddle, it is in the horizontal position parallel to (a), flat against the lower faces of the parts (b) and (c), which are already folded down flat against the lower face of (a) during the first folding phase, covering, at the corner, the rear wheel (r') of the scooter topped by its brake, and partially housed in the opening (n) (FIGS. 2, 3 and 3*bis*).

Figure 7:
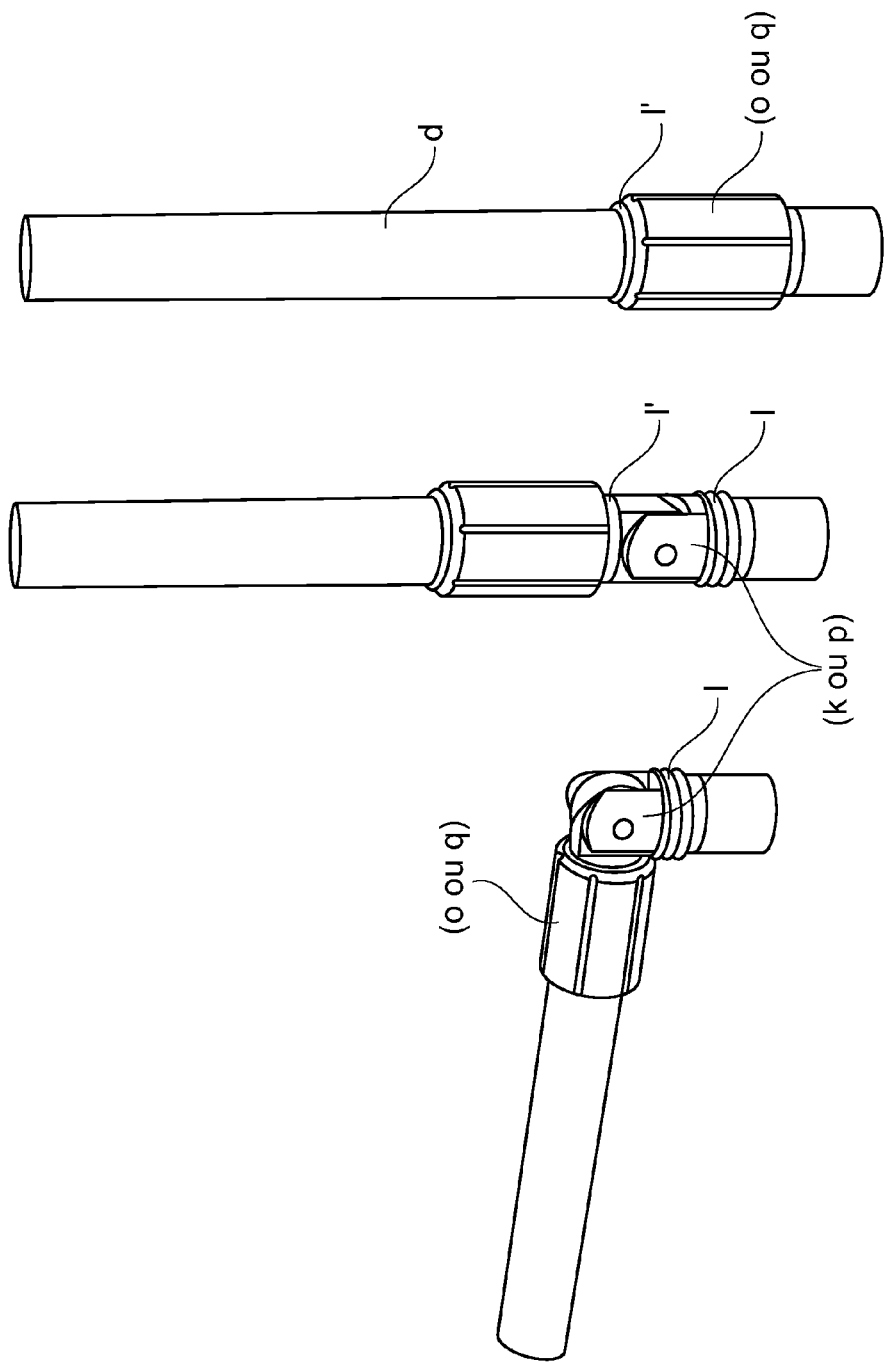
FIG. 7 shows several detail views of a cylindical Cardan joint according an exemplary embodiment of the present invention.

FIG. 7 details the operation of a single cylindrical Cardan joint (k) (identical to (k')) made up of two symmetrical cylindrical axial articulations making it possible to go from verticality to 90°, and each provided with a bottom external threading (1) and a top external threading (1'), both working with the total internal threading of a sleeve (o), intended on the one hand to keep blocked in a line the two symmetrical articulations of a Cardan joint, by complete screwing of the sleeve encompassing them together, and on the other hand to keep the sleeve fixedly screwed above the articulation of the Cardan joint, after its release to allow its operation.

The identical Cardan joints (p) and (p') and their respective sleeves (q) and (q') (FIG. 4), which will be discussed in the following lines, work separately under the same conditions.

FIG. 3 shows that the saddle (d) is centrally, perpendicularly and integrally extended by the following segment (e) of the steering column, which supports, at its base, two consecutive threaded sleeves (q) and (q'), identical, but with a larger diameter than (o) and (o').

These sleeves (q) and (q') (FIG. 4), completely threaded on the inside, cover and maintain respectively, solidly in line, two single cylindrical Cardan joints (p) and (p') with an identical design (k) and (k'). These two Cardan joints (P) and (p') each made up of two symmetrical cylindrical articulations bearing, at each end, an outer thread, working with the inner thread of a sleeve, and connected to one another by a fixed cylindrical portion (v) (FIG. 2), condition the execution of the third and final phase of folding the scooter as follows:

The single Cardan joint (p) is, by its lower articulation, solidly vertically fixed by screwing blocked above and at the center of the saddle (d), lower portion of the steering column.

The two articulations of the single Cardan joint (p) are released by unscrewing the inwardly threaded sleeve (q), which then rises toward the handlebars, and remains fixed, threaded above the intermediate cylindrical portion (v) between (p) and (p').

FIG. 4 shows the released single Cardan (p), and positioned at a right angle so that the sleeve (q), then covering the intermediate cylindrical portion (v) and fixed by its inner thread on the upper articulation of (P), comes, in that angulation, to occupy vertically and midway through the volume, the thickness of the semi-cylindrical indentation (t'), obtained after folding (c) flat on (a), which transposes the middle hole (t) between (c) and (a), before folding down, in the indentation (t') after. As shown in FIG. 4, the hole (t) being cylindrical, the sleeve (q) overhangs the indentation (t'), i.e. necessarily protrudes at mid-volume from that indentation; as already mentioned, with an oblong hole (t) (FIG. 1), the sleeve (q) in the vertical position can be adjusted without overhanging the indentation (t'), which is an advantage both in terms of volume and esthetics. Likewise, the unscrewing of the sleeve (q') frees the single Cardan joint (p') and stays, through its inner threading, screwed above it on the outer threading of its upper articulation, overhanging the tube (e) that vertically extends the saddle (d) beyond the two Cardan joints.

The two articulations of the Cardan joint (p'), once released, allow the tilting at a right angle, parallel to the bases (b) and (c) folded down on (a), of the tube (e) incorporating, sliding, the segment (f), above the wheels (r) and (r'), slightly protruding from the upper plane of (a), which puts an end to the third and final folding step (FIG. 5). It then suffices, to achieve a minimal bulk of the folded scooter, to open the annular gripping fastener (x) (FIG. 1) at the upper end of the tube (e) central portion of the steering column to make the telescoping part (f) slide inside there, which is secured to the center of the handlebars (g), the symmetrical and preferably cylindrical ends of which (g') and (g"), fixed on either side of (g) by a known means such as a ball stop, can be removed and inserted by clipping respectively in the two vertical spring rings (y') and (y") (FIG. 6) formed under the handlebars (g).

The final operation consists of tightening the annular fastener (x) to capture (f) in (e) (FIG. 1).

To keep the inventive scooter compact once it is folded, one may carry out a simple and quick clipping means at the handlebars, among the many that are known. It must be noted that one of the original features of the inventive scooter is that its steering column is arranged for it to be folded in two parts positioned on either side of the bases. It is for this feature that one must obtain a sufficient steering column height so that the scooter may be used by adults, teens and children. In this configuration, one obtains four-stage folding of parallel elements: two stages for the folded-down bases (b) and (c) flat against (a), and two stages for the steering column in two parts, on either side of the folded-down bases: the saddle (d) at the corner on one hand and the telescoping part (e)+(f)+(g) on the other (FIG. 3bis and FIG. 6). For a scooter according to the invention, but the usage of which will be focused on children from 7-8 years to 12-13 years, the steering column would be much shorter than for adults and could be arranged so as to be folded only on a single side as shown by FIGS. 18 and 19.

In these Figures, one can see that:
a. the steering column (FIG. 18) is made up of three telescoping tubes (d), (e) and (f) (the saddle (d) here being conFigured to be the major tube thereof) and the last (f) ends at and secures centrally to the handlebars (g) extended on either side of its two retractable handles (g') and (g"); for example, in a particular configuration for usage by children, if the length of the base (a) of the scooter is about 30 cm, and the diameter of the wheels remains 10 cm, the steering column in three telescoping portions leads the handlebars to about 85 cm from the ground, and that height greatly opens the field of use by children from 7 to 13 years,
b. the child configuration (FIG. 19) of the steering column therefore requires only three-stage folding of parallel elements, two stages for the folded-down bases (b) and (c) flat against (a), but only one stage for the steering column in three telescoping parts (d), (e) and (f), extended from the handlebars (g).

Thus, the child scooter, according to the patent, is characterized after folding by an extremely reduced bulk, allowing it to be transported inside a backpack, which can in turn be transported clipped on the scooter, using a traditional system.

Several means also exist that can improve the robustness, safety, comfort and esthetics of the inventive scooter:

the robustness of the inventive scooter is obviously related to the solidity of the rotary plate (u), but that problem finds an appropriate solution in the compact configuration of the bearing cage on either side of the circular skirt secured to the plate (b) at mid-height thereof; the robustness of the scooter is primarily dependent on the strength of the hinges (h) and (h') (FIG. 1) during its use; to produce these hinges, the calculation of the number of hinge-pins at the end of each base, their dimensions, the diameter of their axes relative to the chosen materials is essential because it must make it possible to use the scooter in all fields where its mechanical strength is stressed to the extreme; aside from that, the hinge line should also be protected by additional means against all risks of shearing and/or pulling out that may exist, particularly when the user performs a vertical drop, at the end of which the two wheels arrive on a horizontal plane at practically the same time, which constitutes the major risk of breakage of the hinges.

In fact, in that case the force instantaneously exerted on the base (a) upon contact with the ground is exponential relative to the user's weight and is calculated using a complex formula depending on a large number of parameters, the most significant of which are: the user's weight, the speed of the scooter, the height of the fall, the length between the two wheel axles, the duration of the crash of the two wheels on the ground, and the nature of the ground.

While the optimal choice of materials used in particular to manufacture the bases (a), (b) and (c) of the scooter (FIG. 1) is important to take into account, it does not completely protect against the resistance to pulling out at the same time as the shearing of the two hinge lines (h) and (h') (FIG. 1), during a vertical, or even oblique, drop, of the scooter on a hard ground, which happens very frequently.

The two hinge lines (h) and (h') can always be strengthened by increasing their dimensions to an acceptable working limit relative to the materials of which they are made; in particular, the diameters of the axles can be increased and one can choose very high-resistance steels for those axles, and technical tests may confirm sufficient robustness.

In the configuration of the bases (a) and (b), and (a) and (c), there is a means for protecting the hinges against shearing or pulling out by absorbing a large part of the very significant vertical force that is exerted on the base (a) during a fall on hard ground. This means consists of arranging, on the two hinge edges of (a) and in the mass of (a), protuberances intended to fit into the opposite edges on (b) and (c) above the hinges.

Figure 17:
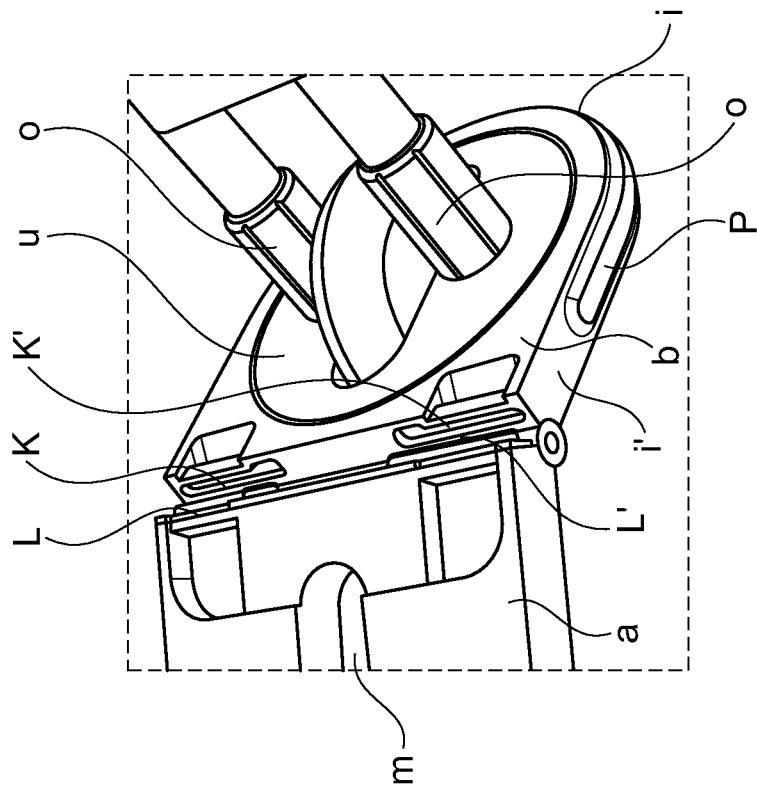
FIG. 17 shows a detail view of the hinge system of the front flat according to the present invention.
Figure 16:
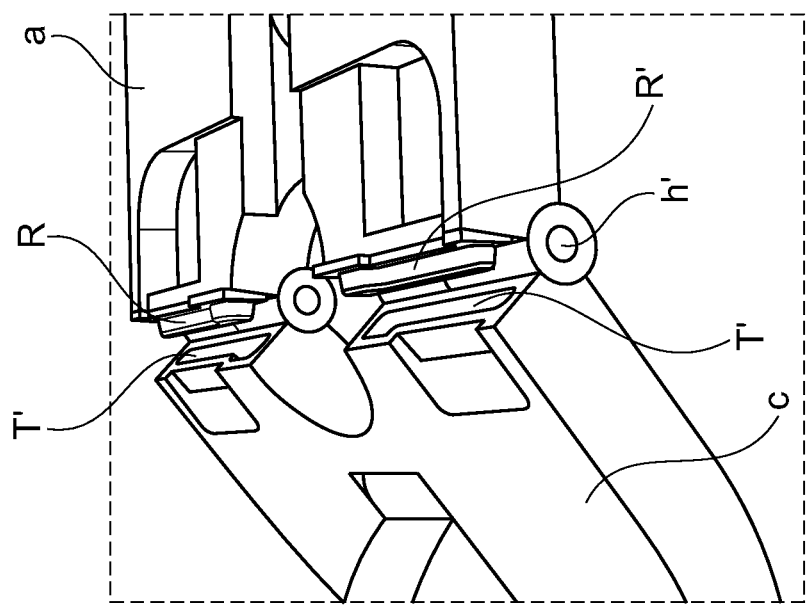
FIG. 16 shows a detail view of the hinge system of the rear flat according to the present invention.

FIGS. 16 and 17 show four protuberances with equal dimensions (L) and (L'), symmetrical to one another on the hinge side between (a) and (b), and (R) and (R') symmetrical to one another on the hinge side between (a) and (c).

During unfolding of the scooter, (L) and (L') on the one hand and (R) and (R') on the other hand fit, while being adjusted, into four female openings with equivalent volumes, formed facing the four protuberances (K) and (K') on (b), and (T) and (T') on (c). Once (a), (b) and (c) are coplanarly locked to one another by the corresponding toggles, the four bilateral fittings of (a) inside the bases (b) constitute, above the hinge lines, a powerful protection of the hinges from shearing and pulling out.

regarding safety, the configuration of the front base (b) (FIG. 1) makes it possible to install, on the length of the edge of the outer arc (i'), by adhesion or clipping, a thick strip (P) (FIG. 17) of rubber, Neoprene or another flexible-hard material for the same use, said strip serving as a bumper.

It should be noted that this means for protecting the front wheel is exclusive to the concept of the inventive scooter, the front wheels of the scooters all being uncovered.

Regarding comfort, let us first recall that the inventive scooter has the important feature, respecting all safety requirements, of being usable both by adults and children, owing to the particular specificity of its telescoping steering height that can vary from 65 cm to 1 m, and of being easy to fold manually in a very small volume.

To achieve this very small volume while maintaining dimensions compatible with usage for adults and teens, the diameter of the wheels should be provided around 10 cm.

In that case, the scooter is at a height of about 5 cm from the ground for its user; at that height, there is little risk of leaning on the hip for the active leg, and skating is therefore made easier and is comfortable.

Nevertheless, this ground clearance of 5 cm can also be decreased for the youngest users; to that end, one need only chamfer the base (a) at the opposite edges of its two widths, by symmetrically freeing, on either side, the value of a planar section angle of several degrees (5° to 7°) between the planes of the edges of the bases (a) and (b) on the one hand, and the bases (a) and (c) on the other hand, these two planar section angles, preferably equivalent to one another, each having the corresponding hinge line for apex line.

This operation can be optimized by chamfering the four contact edges between (a) and (b) on the one hand and (a) and (c) on the other hand, for the same section plane angle value (2.5° to 3.5°).

Figure 11:
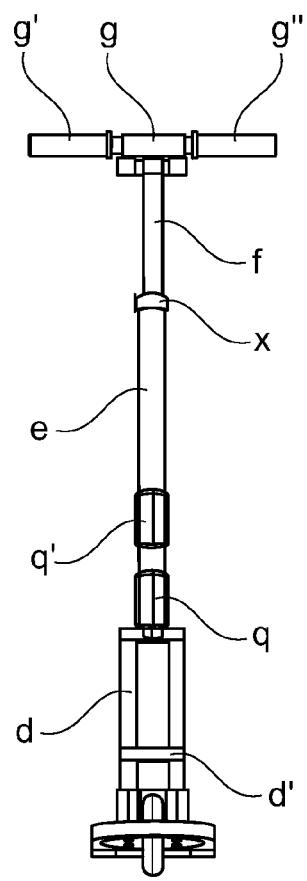
FIG. 11 is a front view of a three-piece scooter device of FIG. 1.
Figure 12:
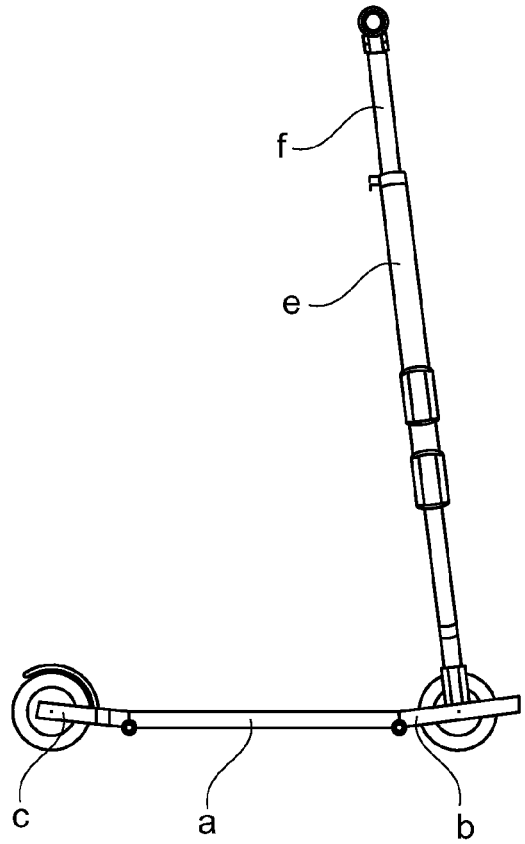
FIG. 12 is a side view of a three-piece scooter device of FIG. 1.
Figure 13:
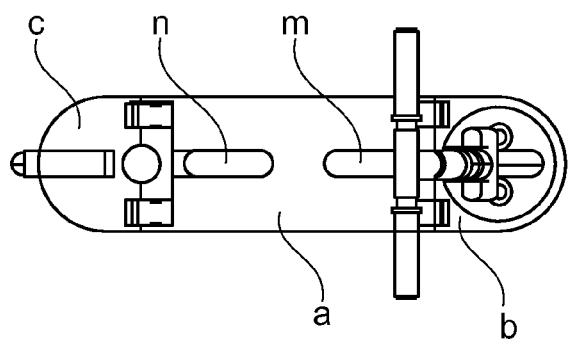
FIG. 13 is a top view of a three-piece scooter device of FIG. 1.

The results of either operation for said angular values are on the one hand lowering the base (a) to about 3.5 to 4 cm from the ground, and on the other hand inclining the steering by at 5° to 7° toward the user. FIGS. 11, 12, 12 illustrate this result.

As an example: when the base (a) is 3.5 cm from the ground, if the handlebars are 1 m from the ground, it advances by about 10 cm toward the user.

An additional improvement to comfort consists of the possibility, between two active periods, of having the user's mobile foot rest on a small, retractable horizontal support, vertically formed flush in the thickness of one of the two vertical supports making up the saddle (d), on the right for a righty, on the left for a lefty.

The end of such a support, in the active position, must not exceed, in projection, the plane of the base (b) above which it is located. This possibility is not shown in the drawings.

Regarding the esthetics, the inventive scooter (both folded and unfolded) in fact embodies new functional forms. These forms, consecutively curved and linear, have tremendous design potential, from which we will retain two applications:

i. Nothing prevents the base (c) supporting the rear wheel (r') provided with its brake (s) from being the same size as the front base (b) supporting the wheel (r), or even identical to it, which would impart perfect symmetry of (b) and (c) relative to (a).

i. If one considers the scooter completely folded, in their last telescoping portion, the two cylindrical sliding steering tubes (e) and (f) (FIG. 1) are located one inside the other in a fixed position above the wheels; it is then possible to imagine arranging, coinciding on the two tubes together, two consecutive longitudinal openings, at the vertical of the wheels, with an indentation width allowing them to just cover, in a secant position, the excess of the two wheels from the upper plane of the board (a), practically concealing them from view.

The solution of a single opening covering both wheels, like the solution with two longitudinally open tubes sliding one in the other, would make the telescoping segment fragile, for which it would then be necessary to compensate by using larger diameters or metals with a high mechanical strength.

Forming longitudinal openings like those described above is not shown in the drawings.

Lastly, although the two oblong openings of the base (a) have a small width (the thickness of a wheel with only a very slight excess), and cannot present any danger of passing through, or laterally hindering the fixed foot, for the esthetics of the base, it could then be appropriate to conceal them when the scooter is in use. To that end, it would suffice to fix as a shoulder/flush on both openings, two clipped guards with the same dimensions, with small thicknesses, preferably obtained by injecting plastic material.

During folding, these two guards could be released from the openings and stored vertically in the two detachable portions (g') and (g") of the handlebars (g).

The guards defined above do not appear in the drawings.

Secondarily, said guards, on the outer face thereof, could be grooved to make the base (a) (FIG. 1) non-slip, the latter in turn being able to be grooved between the two guards for continuity of the grooves.

Figure 20:
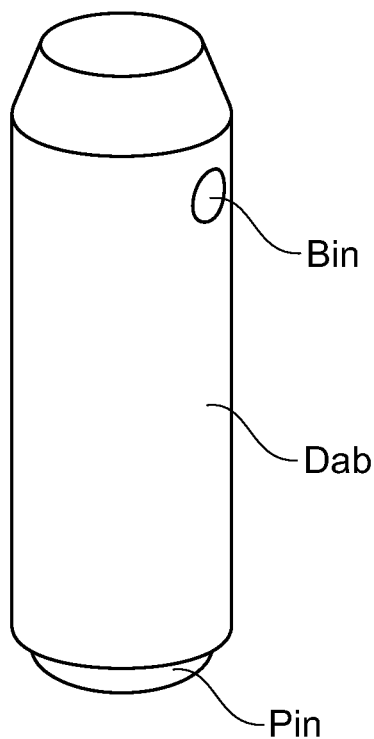
FIG. 20 shows a detail view of the ball finger according to an exemplary embodiment of the present invention showing the ball finger in an inlock position.
Figure 21:
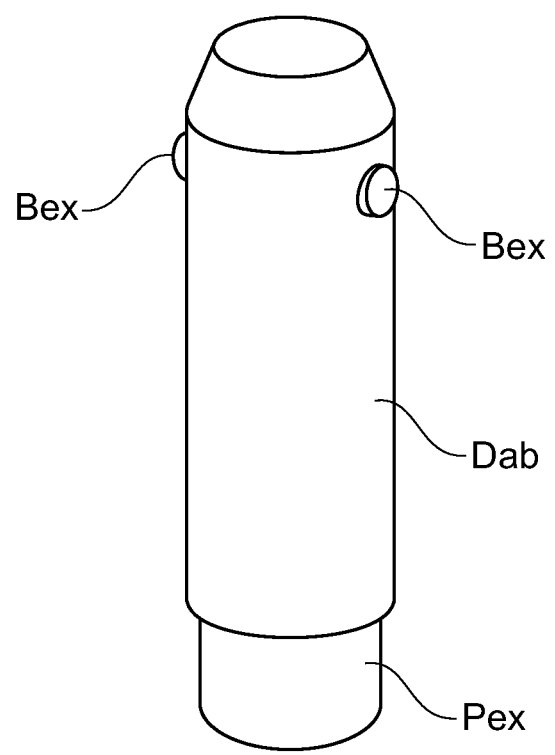
FIG. 21 shows a detail view of the ball finger of FIG. 20 showing the ball finger in a lock position.

The bases 12, 13 and 14 have three options making it possible to fold and unfold the scooter much more quickly, practically semi-automatically: to quickly fold and unfold the steering column, the two single Cardans (q) and (q') (FIG. 1) should be replaced by a single hinge that is easy to lock and unlock using a device that we will call a "ball finger" (Dab) (FIGS. 20 and 21).

This device consists of a hollowed out cylinder at one end of which a piston/spring operates making it possible to produce strong locking by simultaneously activating, via a device inside the cylinder, two symmetrically opposite balls, held captive by the cylinder. When the piston/spring is in the inner position (Pin) (FIG. 20), the two balls (Bin) are flush with, without protruding past, the outer surface of the entire cylinder of the ball finger; when the piston/spring is in the outer position (Pex) (FIG. 21), the two balls (Bex) (FIG. 21) block one another in fixed protrusion from the outer surface of the wall of the cylinder, which makes it possible to capture and diametrically and radially lock, along the ball finger, any preferably biplanar mechanical piece (of the washer type) whereof the inner piercing diameter is equivalent to the outer diameter of the cylinder of the ball finger, while remaining captive/blocked inside the ball finger.

The piston/spring still remains external after locking or unlocking.

Figure 22:
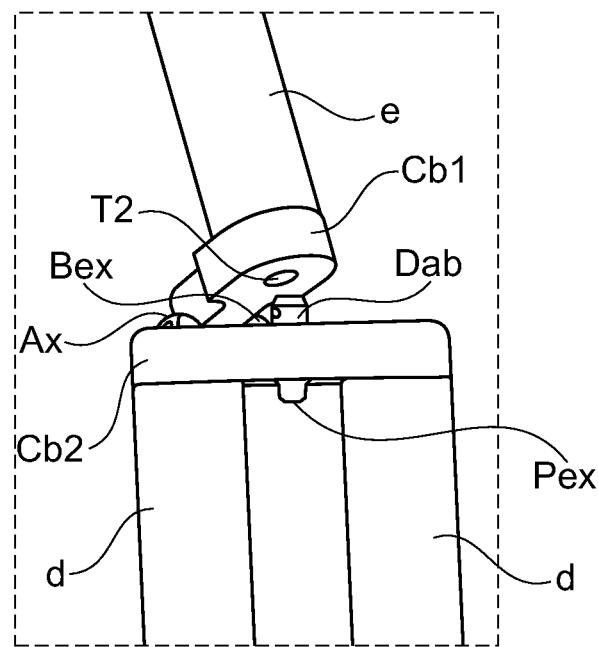
FIG. 22 shows a detail view of the installation of the ball finger of FIG. 20.
Figure 23:
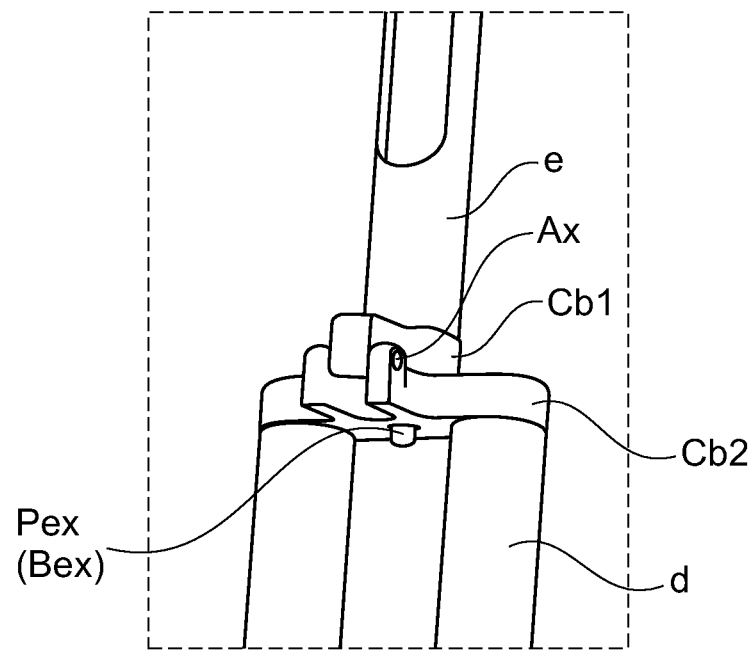
FIG. 23 shows another detail view of the installatin of the ball finger of FIG. 20.

For rapid, or even automatic, folding and unfolding of the steering column, installing a ball finger (Dab) (FIG. 22), fixed centrally and vertically in the body of the fixed portion of the hinge (Cb2) (FIG. 22 makes it possible to keep the hinge closed, and therefore the steering column blocked in line (FIG. 23), the two balls (Bex) (FIG. 22 iametric, then being located in the external position blocked in a suitable central circular opening (Tr) (FIG. 22) of the mobile portion (Cb1)) of the hinge. Simple pressure on the piston/spring (Pex) (FIG. 22) of the ball finger makes it possible to lock the hinge automatically, and the folding of the steering column follows.

Preferably, during folding, the pressure of the piston/spring can be exerted automatically, once the two elements of the steering column are put in line on either side of their shared hinge (Cb1/Cb2), by the action of the internal telescoping tube (f) (FIG. 1) at the upper cylindrical portion of the steering column (e) (FIG. 1), then abutting on the piston/spring of a ball finger fixed centrally in the mobile portion (Cb1)) of the hinge, which enables automatic unlocking thereof at the end of removal of the telescoping tube (f).

Figure 24:
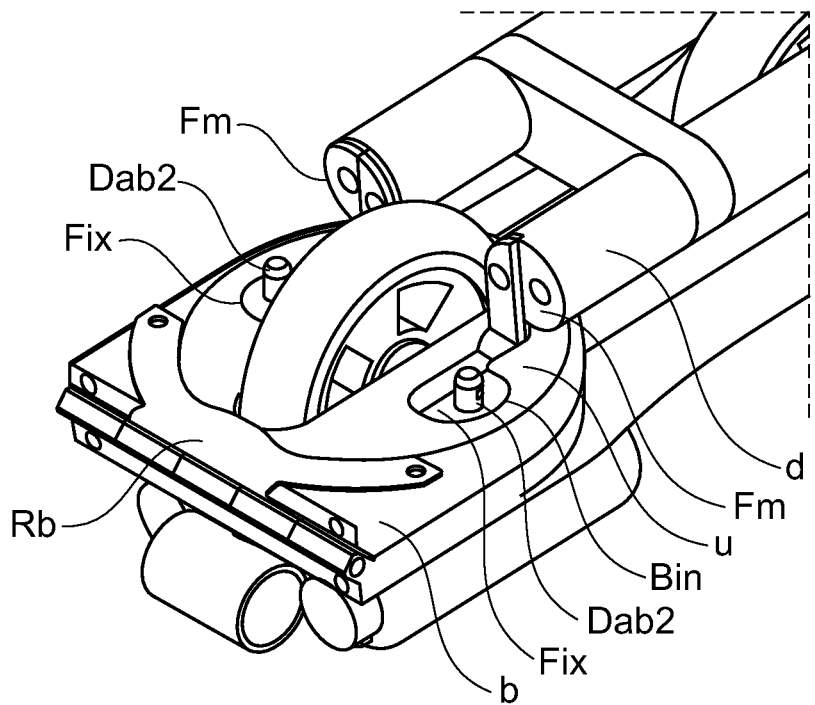
FIG. 24 shows a detail view of a hinge system according to another exemplary embodiment of the present invention.

To quickly fold and unfold the saddle (d) made up of two vertical cylindrical arms (FIG. 1) connected to one another and ending at the mobile horizontal plate (u) (FIG. 1), a system of two identical hinges, comparable to that of FIG. 22, and shown by FIG. 24, will be adapted to the base of each of them so as to replace the two single Cardans (k) and (k') (FIG. 19).

This Figure shows that the symmetrical single Cardans (k) and (k') have been replaced in their respective geometric spaces by two symmetrical hinges whereof the two fixed portions (Fix) (FIG. 24) are incorporated into the mobile horizontal plate (u), and whereof the two mobile portions (Fm) (FIG. 24), working with the preceding parts, are arranged at the two circular bases of the saddle (d).

Figure 25:
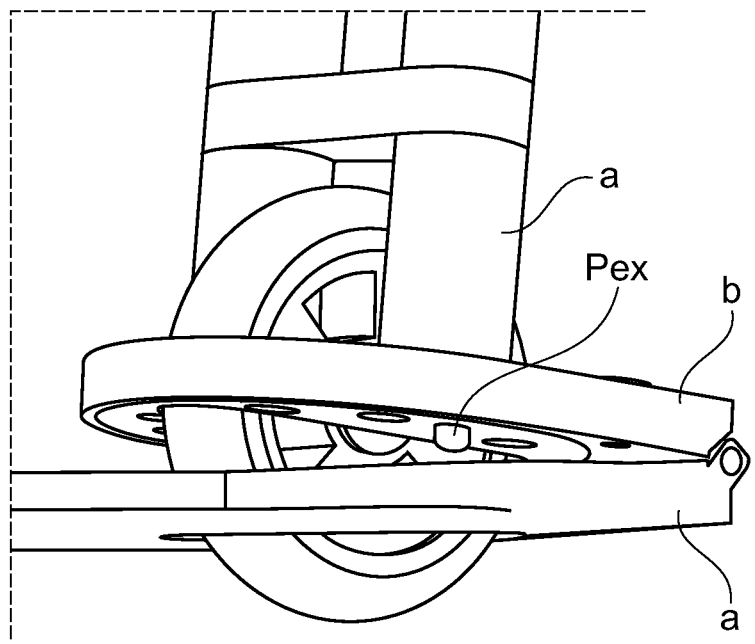
FIG. 25 shows a detailed view showing that the two pistons (Pex) of the two ball fingers are automatically simultaneously pushed in during folding of the front base (b) against the central base (a) of the scooter.

The locking and unlocking of these two hinges is obtained simultaneously by the action of two identical ball fingers, the function of which was described in detail above in its application to the folding of the steering column. FIG. 25 also shows that the two pistons (Pex) of the two ball fingers are automatically simultaneously pushed in during folding of the front base (b) against the central base (a) of the scooter, which results in automatically unlocking the two hinges, and the folding of the saddle follows.

The principle of the ball finger can lead to the idea of replacing the balls with preferably cylindrical elements allowing a much longer protrusion outside by the cylinder than the balls for deeper catching and ten times the mechanical strength of the locking.

One may provide, arranged concentrically to the ball finger, a gripping system using a toothed wheel making it possible to eliminate any play in the hinges after locking.

The hinge of the steering column as well as the two hinges of the saddle must, for safety reasons, have their respective axles toward the scooter's user, so as to offer the best possible strength of the steering column in case of collision of the front wheel.

The overall configuration of the steering enables that safety.

An improvement can also be made to coplanarly secure the central base (a) with the front base (b), before using the scooter.

Figure 26:
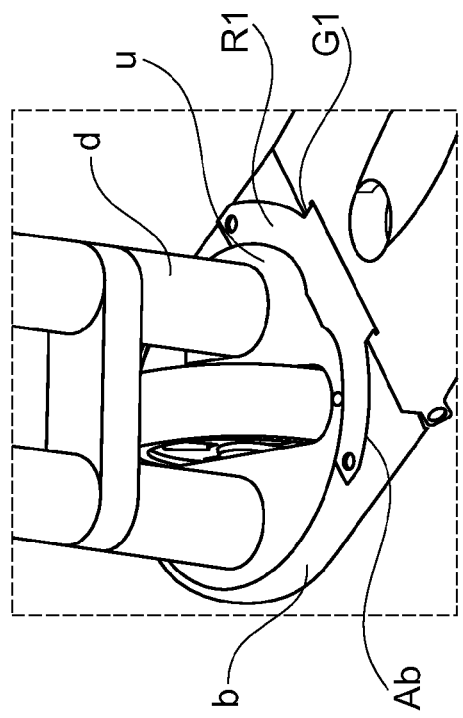
FIG. 26 a detailed view of the plate spring according to an exemplary embodiment of the present invention showing the plate spring in a lock position.
Figure 28:
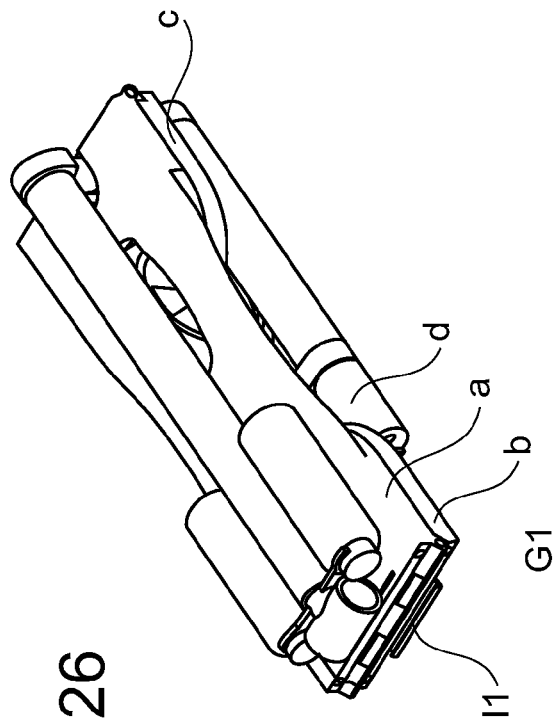
FIG. 28 shows a perspective front view of the three-piece scooter device of FIG. 1 showing the three piece scooter in a storage position.
Figure 27:
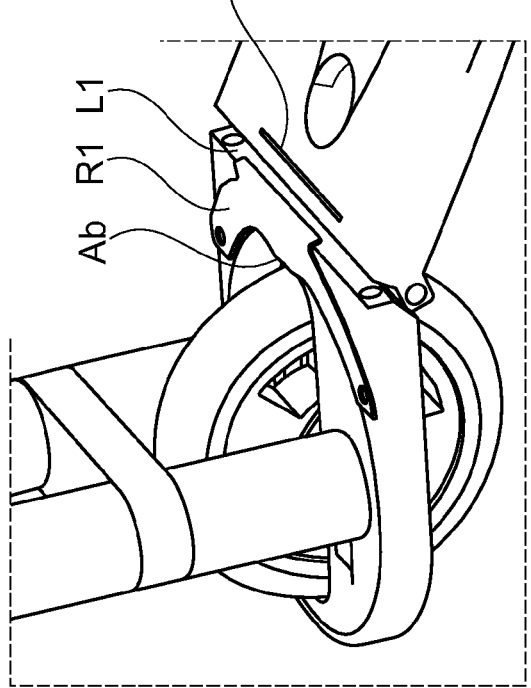
FIG. 27 a detailed view of the plate spring of FIG. 26 in an unlock position.

FIGS. 26 and 27 show, and consists of a thick plate spring (RI) (FIG. 26) preferably fixed concentrically to the mobile horizontal plate (u) and on the base (b), or incorporated into the thickness of the base (b) symmetrically on the arc of circle of the fixed base of the plate juxtaposing the hinge between (a) and (b).

This plate spring (R1) is formed by a longitudinal return in the form of a tab (L1) (FIG. 26), which is characterized by a fixed angulation, pseudo-perpendicular (by default) to the plane of (R1); the tab (L1) slightly protrudes from the plane of the base (b) to allow it to be locked in a longitudinal groove (G1) (FIG. 26) of the base (a) parallel to the connecting axle between (a) and (b).

A ball, preferably rotating (Ab) (FIG. 26), of the ball bearing ball type, integrally fixed in the volume of the mobile horizontal plate (u), centrally positioned in front of the outer arc of the wheel passage (when the scooter is rolling), and protruding from the upper plane of the plate at a suitable height, makes it possible, by rotating the steering column driving the plate, to lift the spring (R1) by going from a "ball outside the spring" position to a "ball under the spring" position (FIGS. 26 and 27), and vice versa.

Lifting of the spring (R1) by the ball (Ab) frees the tab (L1) from its locked position along and inside the groove (G1) (FIG. 26), formed on the base (a) parallel to the hinge line between the bases (a) and (b).

(L1) and (G1) thus operate relative to one another by locking/unlocking, to secure, coplanar, or separate the bases (a) and (b).

It is important to note that it is only when the scooter is folded, after rotating the handlebars 180° to the right or left, that the ball is positioned under the spring (R1) to unlock the tab (L1) (FIGS. 26 and 27), therefore to separate the bases (a) and (b).

Therefore, during use of the scooter, the position of the ball, in front of the front wheel, with for that wheel an extreme turn limit of 90° to the right or left, makes the unlocking of the tab (L1) impossible. FIG. 26 shows how the tab (L1) of the spring (R1) is positioned longitudinally at the end of the base (b) on the base (a) of the scooter.

The tab (L1) may be provided to be much longer and taller than that shown in for better catching, which assumes that the groove (G1) respectively has the same length and depth.

Ideally, after folding, the tab (L1) must not overhang the structure of the scooter beyond the connecting axle between the bases (a) and (b) parallel to it; the pseudo-angulation of less than 90° of the tab (L1) with the plane of the spring (RI) makes it possible to avoid any possibility of catching, while strengthening the coplanar locking of (a) and (b). Lastly, the tab (L1) must form, with the plane of (R1), an angulation smaller than 90° to avoid any catching problem.

The invention claimed is:

1. A folding three-piece scooter having retractable wheels comprising:

a central base having a top face, a bottom face, a first side, a second side, and a first and second longitudinally aligned openings, aligned along one longitudinal direction of the central base;

a rear base hinged to a first end of the bottom face of the central base;

a front base hinged to a second end of the bottom face of the central base;

a first slit formed through the rear base;

a rotatable plate on the front base, on which is formed a second slit;

a first wheel connected to the first slit;

a second wheel connected to the second slit about a first axis;

a steering handle pivotably connected to the rotatable plate, about a second axis parallel to the first axis, this steering handle being pivotable between a working position, wherein the steering handle vertically projects from said rotatable plate, and a storage position, wherein the steering handle folds against said rotatable plate, along the top face of the central base;

the rear base and the front base fold towards the bottom face of the central base when the folding three-piece scooter is in a storage position, said first wheel penetrating said first opening in said storage position, and said second wheel penetrating said second opening in said storage position in such a manner that the rotation of said rotatable plate is blocked in a position in which said first and second axis are perpendicular to said longitudinal direction;

the rear base and the front base align with the upper face of the central base when the folding three-piece scooter is in a working position.

2. The folding three-piece scooter according to claim 1, further including friction pads between the central base and the rear base and the front base and the central base.

3. A folding three-piece scooter having retractable wheels comprising:

a central base having a top face, a bottom face, a first side, a second side, and a first and a second longitudinally aligned openings;

a rear base hinged to a first end of the bottom face of the central base;

a front base hinged to a second end of the bottom face of the central base;

a first slit formed through the rear base;

a second slit formed through the front base;

a first wheel connected to the first slit;

a second wheel connected to the second slit;

a steering handle pivotably connected to the front base;

the rear base and the front base fold towards the bottom face of the central base when the folding three-piece scooter is in a storage position;

the rear base and the front base align with the upper face of the central base when the folding three-piece scooter is in a working position;

a locking mechanism placed between the central base and the front base and between the central base and the rear base to keep the front base and the rear base locked on a fixed position on the storage position or the working position.

4. The folding three-piece scooter according to claim 1, wherein the steering handle has a fork-shaped lower part with two parallel side elements (d) extending one apart the other, on each side of said second wheel.

5. The folding three-piece scooter according to claim 4, wherein said fork-shaped lower part is hinged to an intermediate part of the steering handle and this intermediate part is hinged to an upper part of the steering handle; in said storage position, said parallel side elements (d) extends along said folded rear base and front base, on each side of said first and second wheels, said intermediate part extending along said edges of said rear base and central base, and said upper part (e) extending along said upper face of the central base.

6. The folding three-piece scooter according to claim 4, wherein said upper part of the steering handle has openings allowing this upper part to be inserted on said first and second wheels in the storage position.

7. The folding three-piece scooter according to claim 5, wherein a circular opening is arranged over the junction of the central base and the rear base such that a half-part of this hole is arranged in the central base and a half-part of this hole is arranged in the rear base; in the folded position, these two half-parts overlap to form a notch receiving said intermediary part.

8. The folding three-piece scooter according to claim 4, wherein said fork-shaped lower part is integral with an upper part of the steering handle.

9. The folding three-piece scooter according to claim 7, wherein said upper part includes several telescopic members.

10. The folding three-piece scooter according to claim 8, wherein said upper part of the steering handle has openings allowing this upper part to be inserted on said first and second wheels in the storage position.

* * * * *